Nov. 12, 1929.                R. H. GARMAN                  1,735,456
                            EDUCATIONAL DEVICE
                            Filed Jan. 30, 1929
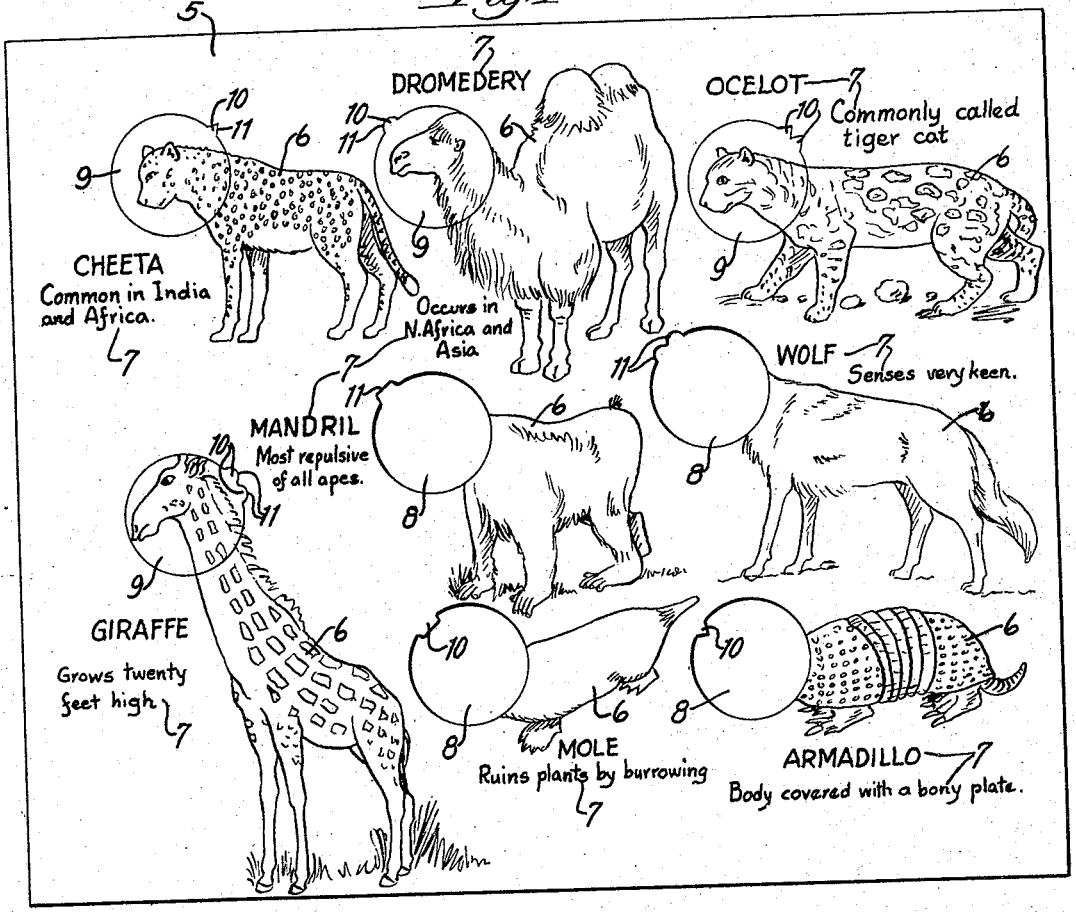
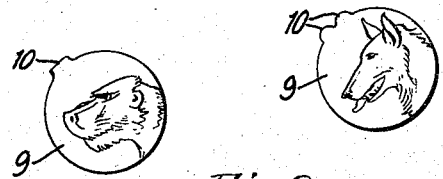
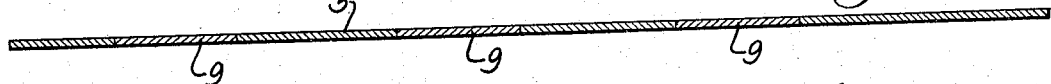

Patented Nov. 12, 1929

1,735,456

UNITED STATES PATENT OFFICE

RAYMOND H. GARMAN, OF WILMETTE, ILLINOIS

EDUCATIONAL DEVICE

Application filed January 30, 1929. Serial No. 336,044.

This invention relates to educational devices, and its principal object is to provide a simple, amusing and instructive device for the entertainment of children and others. Another object is to provide an educational device having pictorial representations of animals, birds, fishes or the like thereon, of which certain portions of the illustrations are contained upon inserts fitting in correspondingly shaped openings in a main or base member and wherein the correct assembling of the inserts with the base member depends not only upon the matching of the component parts of the illustrations, but in addition thereto the matching of certain interfitting keys and the notches in the inserts and base member.

The invention consists in a cardboard or other base member having incomplete pictorial illustrations thereon, together with associated descriptive legends of the various objects, the base member being formed with openings for the reception of inserts which contain illustrations that are component parts of the complete illustrations, and the marginal edges of the inserts and openings in the base member being provided with interfitting keys or tongues and notches whereby when a proper insert is placed in a proper opening, the part of the illustration on the insert completes the incomplete illustration on the base member.

The invention further consists in the several novel features hereinafter more fully set forth and claimed.

The invention is clearly illustrated in the drawing accompanying this specification in which—

Figure 1 is a plan or face view of one of the educational devices forming the subject matter of this invention, and showing some of the inserts removed therefrom;

Fig. 2 is a face view of the inserts which have been removed from Fig. 1; and

Fig. 3 is a detail horizontal section taken on the line 3—3 of Fig. 1.

Referring to said drawing, the reference character 5 designates a cardboard sheet or other base member containing on one or both of its faces incomplete pictorial illustrations 6 of objects, such as animals, birds, fishes, or the like, which are completed by assembling with the base member certain inserts as will be presently explained. Adjacent each illustration is a descriptive legend 7 of the object depicted. Coincident with some portion of each complete illustration, as, for instance, with the head of each object depicted, apertures or openings 8 are formed in the base member in which are contained inserts 9, each insert conforming to and fitting into a proper opening and containing that part of the illustration which goes to complete the same.

The openings and inserts are preferably circular and may be substantially similar in form, or they may be of different sizes and shapes, if desired, and the edge portions of the inserts and openings are formed with interfitting keys or tongues 10 and notches 11. In some cases the keys may be formed upon the inserts and the notches may be formed in the base member, and, in other instances, the keys may be formed upon the base member to correspond with notches formed in the edge portions of the inserts. If desired, the keys of the several inserts may be similar in shape, or they may assume various shapes, and the notches or keys in the base member may be located at different places in the edges of the openings.

It is to be observed that each opening and the associated insert for any given illustration have their own peculiar interfitting notch and key disposed at a predetermined place about the circumference of the opening, and that an insert may enter in any one of several openings without registering the two component parts of the complete illustration, but that the key will properly register the part of the illustration on the insert with the associated part thereof on the base member when the insert is placed in the opening which has its notch located at the proper place around the circumference of the opening corresponding to the location of the key on the insert.

In order to obtain a perfect register between the parts of the illustrations contained on the inserts with the respective companion illustrations contained on the base member, the complete illustrations are first applied to the cardboard, after which the parts forming the inserts are punched out of the material with suitable dies having configurations conforming to the inserts. It will be seen, therefore, that when reassembled, the inserts fit perfectly in the places from which they were punched out with the component parts of the illustration in register.

From the above it will be understood that the base portion contains incomplete pictorial representations which may be completed when the inserts are correctly placed in the openings in the cardboard base, and that the part of the illustration depicted on each insert, together with the location of the key or notch thereon, serves as an aid in determining the proper opening for the reception of the insert. Furthermore, when the proper insert is selected for a given place and is inserted therein, the interfitting key and notch arrangement furnishes means whereby the two parts of the complete illustration will register properly with each other.

I claim:

1. An educational device of the class described, comprising in combination a cardboard base member having incomplete pictorial illustrations of objects thereon, said base member being formed with openings coinciding with portions of the pictorial illustrations when completed, and cardboard inserts having thereon pictorial illustrations for completing the incomplete illustrations on the base member, the edges of the openings and inserts having differently shaped interfitting parts, whereby the part of the illustration on an insert will complete an incomplete illustration on the base member when the proper insert is placed in an opening corresponding thereto.

2. An educational device of the class described, comprising in combination a base member having incomplete pictorial illustrations of objects thereon and formed with substantially similar openings coinciding with portions of the pictorial illustrations when completed, and inserts having thereon pictorial illustrations for completing the incomplete illustrations on the base member, the base member and inserts being formed with interfitting keys and notches variously disposed around the circumferences of the openings and inserts, any insert of which is capable of entering any of several openings without registering the part of the illustration on the insert with the associated part of an illustration, but capable only of registering the associated parts of a complete illustration when placed in an opening where the key and notch fit and are located at corresponding positions on the insert and opening.

3. An educational device of the class described comprising a base member having portions struck out therefrom to leave openings therein, the marginal edges of the portions and openings having interfitting keys and notches variously disposed therearound, and said base member having printed thereon pictorial illustrations, one illustration associated with each struck out portion and bearing a portion of the pictorial illustration thereon.

In testimony whereof, I have hereunto set my hand and affixed my seal this 25th day of January, 1929.

RAYMOND H. GARMAN.